United States Patent
Sankaranarasimhan et al.

(10) Patent No.: US 9,575,740 B2
(45) Date of Patent: Feb. 21, 2017

(54) APPARATUS AND METHOD FOR RUNNING MULTIPLE INSTANCES OF A SAME APPLICATION IN MOBILE DEVICES

(71) Applicant: Samsung Electronics Co., Ltd., Suwon-si, Gyeonggi-do (KR)

(72) Inventors: Manikandan Sankaranarasimhan, Fremont, CA (US); William Swaney, Palo Alto, CA (US); Victor Havin, Foster City, CA (US); Toru Ishihara, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 14/601,821

(22) Filed: Jan. 21, 2015

(65) Prior Publication Data

US 2016/0210130 A1     Jul. 21, 2016

(51) Int. Cl.
*G06F 9/445*     (2006.01)
*G06F 21/53*     (2013.01)

(52) U.S. Cl.
CPC ................ *G06F 8/61* (2013.01); *G06F 21/53* (2013.01)

(58) Field of Classification Search
CPC ............................................. G06F 8/60–8/71
USPC .................................................. 717/174–178
See application file for complete search history.

(56) References Cited

U.S. PATENT DOCUMENTS

| | | | | |
|---|---|---|---|---|
| 6,823,376 B1 * | 11/2004 | George | ................... | H04L 29/06 709/200 |
| 6,917,963 B1 * | 7/2005 | Hipp | .................... | G06F 9/44505 709/204 |
| 7,519,814 B2 * | 4/2009 | Rochette | ................... | G06F 8/60 709/214 |
| 7,941,813 B1 * | 5/2011 | Protassov | ............. | G06F 9/4411 710/33 |
| 8,176,321 B1 * | 5/2012 | Perry | ...................... | G06F 21/53 713/167 |
| 8,448,244 B1 * | 5/2013 | Kukulski | ................ | G06F 21/53 713/187 |
| 8,666,938 B1 * | 3/2014 | Pancholy | ................ | G06F 9/455 707/610 |
| 8,732,474 B1 * | 5/2014 | Perry | ...................... | G06F 21/53 713/156 |
| 8,793,291 B2 * | 7/2014 | Plax | ......................... | G06F 8/65 707/624 |

(Continued)

OTHER PUBLICATIONS

App Cloner 1.2.1—by AppListo; Jun 15, 2014. http://www.apkmirror.com/apk/applisto/app-cloner/app-cloner-1-2-1-release/app-cloner-1-2-1-android-apk-download/#description.*

(Continued)

*Primary Examiner* — Francisco Aponte
(74) *Attorney, Agent, or Firm* — Jefferson IP Law, LLP

(57) ABSTRACT

An apparatus and method for isolating at least one of a plurality of applications included in an electronic device are provided. The method includes selecting at least one of the plurality of applications included in the electronic device, preprocessing the at least one selected application so as to be at least one modified application included in a sandbox isolating the at least one selected applications from others of the plurality of applications, and installing the at least one modified application on the electronic device so as to be executed only according to the sandbox.

20 Claims, 9 Drawing Sheets

(56) References Cited

U.S. PATENT DOCUMENTS

| | | | | |
|---|---|---|---|---|
| 8,793,348 | B2* | 7/2014 | Ott | G06F 8/61 709/220 |
| 8,799,862 | B2* | 8/2014 | Adamson | G06F 11/3664 717/102 |
| 8,819,638 | B2* | 8/2014 | Sharma | G06F 11/3688 714/37 |
| 8,887,152 | B1* | 11/2014 | Chen | G06F 9/44568 717/174 |
| 8,930,917 | B2* | 1/2015 | Mittal | G06F 11/366 717/124 |
| 8,966,632 | B1* | 2/2015 | Huang | G06F 21/566 713/183 |
| 9,055,080 | B2* | 6/2015 | Sandhu | G06F 8/61 |
| 9,069,607 | B1* | 6/2015 | Gopalakrishna Alevoor | G06F 9/45558 |
| 9,095,779 | B2* | 8/2015 | Chan | A63F 13/12 |
| 9,116,768 | B1* | 8/2015 | Sawhney | G06F 8/60 |
| 9,208,328 | B2* | 12/2015 | Russello | G06F 21/60 |
| 9,319,270 | B2* | 4/2016 | Bestmann | H04L 41/08 |
| 2005/0198647 | A1* | 9/2005 | Hipp | G06F 9/44505 719/310 |
| 2008/0005472 | A1* | 1/2008 | Khalidi | G06F 9/44584 711/115 |
| 2008/0016339 | A1* | 1/2008 | Shukla | G06F 21/53 713/164 |
| 2008/0263511 | A1* | 10/2008 | Shapiro | G06F 8/61 717/104 |
| 2009/0259993 | A1* | 10/2009 | Konduri | G06F 11/3664 717/127 |
| 2009/0307477 | A1* | 12/2009 | Matthew | G06F 8/60 713/2 |
| 2010/0262970 | A1* | 10/2010 | Havemose | G06F 9/545 718/104 |
| 2010/0281458 | A1* | 11/2010 | Paladino | G06F 8/71 717/106 |
| 2011/0072505 | A1* | 3/2011 | Ott | G06F 8/61 726/11 |
| 2011/0126190 | A1* | 5/2011 | Urbach | G06F 9/44521 717/178 |
| 2011/0138474 | A1* | 6/2011 | Yee | G06F 9/445 726/26 |
| 2011/0219365 | A1* | 9/2011 | Foxman | G06F 9/455 717/168 |
| 2012/0246634 | A1* | 9/2012 | Wright | G06F 9/455 717/174 |
| 2013/0036448 | A1* | 2/2013 | Aciicmez | G06F 21/6218 726/1 |
| 2013/0145463 | A1* | 6/2013 | Ghosh | G06F 21/56 726/22 |
| 2013/0185764 | A1* | 7/2013 | Krstic | G06F 21/53 726/2 |
| 2015/0074165 | A1* | 3/2015 | Rahardja | H04L 67/10 709/201 |
| 2015/0235043 | A1* | 8/2015 | Haik | G06F 21/6218 726/27 |
| 2015/0347746 | A1* | 12/2015 | Martel | G06F 21/53 726/1 |
| 2015/0347749 | A1* | 12/2015 | Kiehtreiber | G06F 21/53 726/26 |
| 2016/0132310 | A1* | 5/2016 | Koushik | G06F 8/61 717/176 |

OTHER PUBLICATIONS

Youtube video—Clone App & Change Name App Android—Hanry Dwia Priandana—Published on Dec. 8, 2014—https://www.youtube.com/watch?v=2yspdyAYZuI.*

An Android Application Sandbox System for Suspicious Software Detection—Thomas Bläsing, Leonid Batyuk, Aubrey-Derrick Schmidt, Seyit Ahmet Camtepe, and Sahin Albayrak Technische Universität Berlin—DAI-Labor—2010 IEEE.*

AndroidLeaks: Automatically Detecting Potential Privacy Leaks in Android Applications on a Large Scale—Clint Gibler, Hao Chen—University of California, Davis—Jonathan Crussell, Jeremy Erickson—University of California, Davis and Sandia National Labs, Livermore, CA—Trust 2012, LNCS 7344, pp. 291-307, 2012.*

Application Virtualization as a Strategy for Cyber Foraging in Resource-Constrained Environments—Dominik Messinger and Grace Lewis; May 2013—Research, Technology, and System Solutions Program—2013 Carnegie Mellon University.*

Paul Pocatilu, "Android Applications Security", Informatica Economica, No. 3/2011, Jan. 1, 2011, pp. 163-171, vol. 15.

Rishabh Jain, "How to Run Multiple Instances of One App on Your Android", http:// swa pm ya pp. com/how-to/run-multiple-instances-of-one-a pp/, May 25, 2016, pp. 1-7.

* cited by examiner

APPARATUS AND METHOD FOR RUNNING MULTIPLE INSTANCES OF A SAME APPLICATION IN MOBILE DEVICES

TECHNICAL FIELD

The present disclosure relates to an apparatus and method for running multiple instances of a same application in mobile devices. More particularly, the present disclosure relates to an apparatus and method for running multiple instances of a same application in mobile devices without sharing data.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and other similar functions.

Additionally, mobile terminals may execute applications, which may provide the above noted functions and/or provide other functions and/or operations on the mobile terminals. For example, the applications may include a music playback application, a video playback application, a photo gallery application, game applications, social networking applications, internet browsing applications, file management applications, cloud service applications, and any other similar and/or suitable applications, functions, and/or operations. However, an Operating System (OS) of a mobile terminal, such as an Android OS and/or any other similar and/or suitable OS, may not allow installation and/or execution of multiple instances of a same application on the mobile terminal. For example, if a user of a mobile terminal attempts to download and/or install a second copy of an application, the OS of the mobile terminal may prevent the downloading and/or installation of the second copy of the application unless a first copy of the application is removed, deleted, and/or overwritten. However, a user of a mobile terminal may desire install and/or execute more than one instance of an application on a mobile terminal. Accordingly, there is a need for an apparatus and method for providing an improved user interface while reducing power consumption in a mobile terminal.

SUMMARY

Aspects of the present disclosure are to address at least the above-mentioned problems and/or disadvantages and to provide at least the advantages described below. Accordingly, an aspect of the present disclosure is to provide an apparatus and method for running multiple instances of a same application in mobile devices. More particularly, the present disclosure relates to an apparatus and method for running multiple instances of a same application in mobile devices without sharing data.

In accordance with an aspect of the present disclosure, a method for isolating at least one of a plurality of applications included in an electronic device is provided. The method includes selecting at least one of the plurality of applications included in the electronic device, preprocessing the at least one selected application so as to be at least one modified application included in a sandbox isolating the at least one selected applications from others of the plurality of applications, and installing the at least one modified application on the electronic device so as to be executed only according to the sandbox.

In accordance with another aspect of the present disclosure, an apparatus for isolating at least one of a plurality of applications included in an electronic device is provided. The apparatus includes a display configured to display the plurality of applications included in the electronic device and to receive a user input selecting at least one of the plurality of applications, a processor configured to preprocess the at least one selected application so as to be at least one modified application included in a sandbox isolating the at least one selected applications from others of the plurality of applications and to install the at least one modified application on the electronic device so as to be executed only according to the sandbox; and a memory 130 configured to store the at least one modified application.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
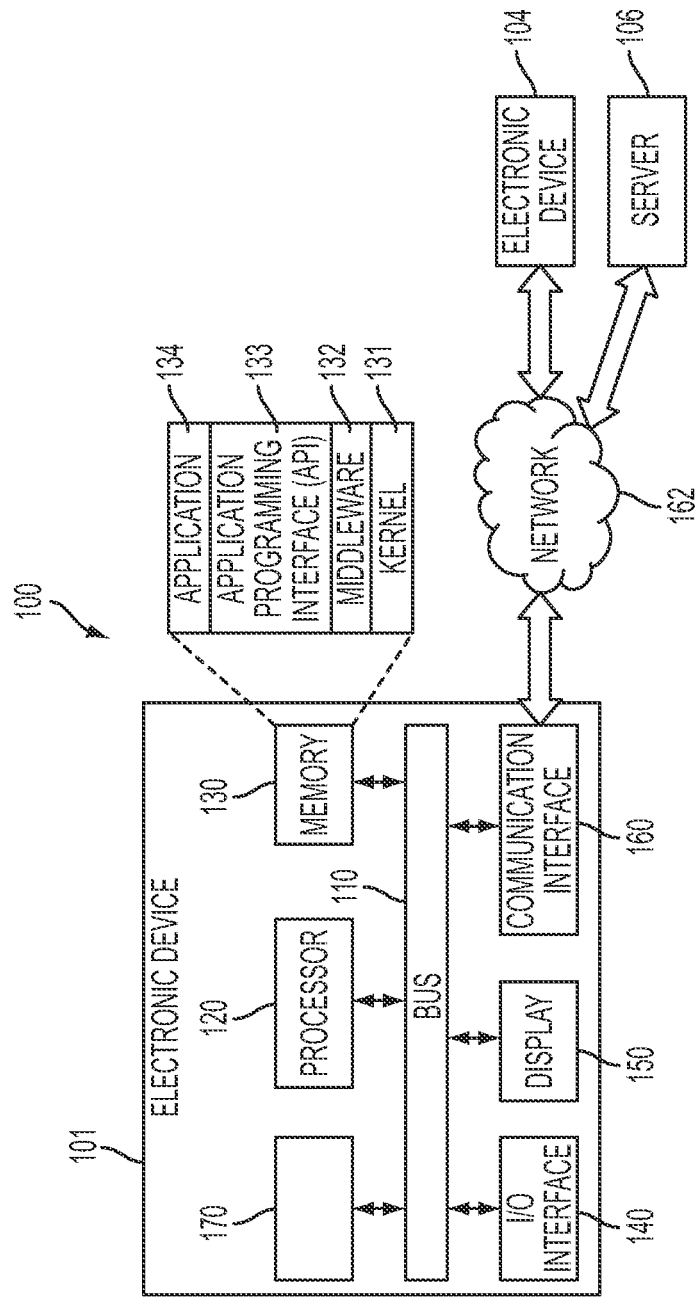
FIG. 1 illustrates a network environment including an electronic device according to an embodiment of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of an embodiment of the disclosure as defined by the claims and their equivalents. It includes various specific details to assist in that understanding but these are to be regarded as merely exemplary. Accordingly, those of ordinary skill in the art will recognize that various changes and modifications of an embodiment described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of an embodiment of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to an embodiment of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to an embodiment of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to an embodiment of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to an embodiment of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to an embodiment of the present disclosure, an electronic device may be any combination of the foregoing devices. In addition, it will be apparent to one having ordinary skill in the art that an electronic device according to an embodiment of the present disclosure is not limited to the foregoing devices.

An embodiment of the present disclosure includes an apparatus and method for running multiple instances of a same application in mobile devices without sharing data.

An embodiment of the present disclosure provides isolation for Android applications and allows for multiple installations of a same Android application. For example, applications included and/or installed on a mobile terminal may be cloned so as to have a same logic and/or presentation layer as an original application. The cloned applications may be modified to distinguish the cloned applications from the original application, while having the same logic and/or presentation layer as the original application.

The cloning of the applications and the distinguishing of the applications may be performed in order to execute and/or maintain separate user accounts of an application for services provided according to a user account, such as a Facebook application, a social networking application, a streaming media service, an email application, a Virtual Private Network (VPN) application, a cloud service application, and any other similar and/or suitable application. The cloning and distinguishing of the applications may also allow for installation of applications in sandboxes, which allows for at least one application to be included in a sandbox so as to share resources among the applications included in the sandbox and to restrict sharing of resources with applications not included in the sandbox.

In other words, a sandbox may be a group of running programs, i.e. programs that are currently being executed, that are separated from and do not share resources with other programs that are not in the group included in the sandbox. Accordingly, programs and/or applications that may be untrusted, unverified, and/or untested, may be separated from applications in the sandbox, i.e., applications that may be tested, verified and/or trusted applications, in order to provide a secure environment for the execution of the applications in the sandbox without having to ensure integrity of a system that includes the sandbox. Additionally, cloning and distinguishing the applications allows for multiple sessions, or in other words, multiple instances, of an application to be executed at a same time, and allows for any other similar and/or suitable services and/or cases that execute multiple sessions of an application at the same time without sharing data between respective sessions of the multiple sessions of the application that are executed at the same time.

FIG. 1 illustrates a network environment including an electronic device according to an embodiment of the present disclosure.

Referring to FIG. 1, a network environment 100 includes an electronic device 101. The electronic device 101 may include a bus 110, a processor 120, a memory 130, an Input/Output (I/O) interface 140, a display 150, a communication interface 160, an application processing module 170, and/or the like.

The bus 110 may be circuitry that connect the foregoing components and allow communication between the foregoing components. For example, the bus 110 may connect components of the electronic device 101 so as to allow control messages and/or other infomraiton to be communicated between the connected components.

The processor 120 may, for example, receive instructions from other components (e.g., the memory 130, the I/O interface 140, the display 150, the communication interface 160, the application processing module 170, and/or the like), interpret the received instructions, and execute computation or data processing according to the interpreted instructions.

The memory 130 may, for example, store instructions and/or data that are received from, and/or generated by, other components, e.g., the memory 130, the I/O interface 140, the display 150, the communication interface 160, the application processing module 170, and/or the like. For example, the memory 130 may include programming modules such as a kernel 131, a middleware 132, an Application Programming Interface (API) 133, an application 134, and/or the like. Each of the foregoing programming modules may include a combination of at least two of software, firmware, or hardware.

The kernel 131 may control or manage system resources (e.g., the bus 110, the processor 120, the memory 130, and/or the like) that may be used in executing operations or functions implemented in other programming modules such as, for example, the middleware 132, the API 133, the application 134, and/or the like. The kernel 131 may provide an interface for allowing or otherwise facilitating the middleware 132, the API 133, the application 134, and/or the like, to access individual components of electronic device 101.

The middleware 132 may be a medium through which the kernel 131 may communicate with the API 133, the application 134, and/or the like to send and receive data. The middleware 132 may control (e.g., scheduling, load balancing, and/or the like) work requests by the application 134. For example, the middleware 132 may control work requests by the application 134 by assigning priorities for using system resources (e.g., the bus 110, the processor 120, the memory 130, and/or the like) of electronic device 101 to the application 134.

The API 133 may be an interface that may control functions that the application 134 may provide at the kernel 131, the middleware 132, and/or the like. For example, the API 133 may include at least an interface or a function (e.g., command) for file control, window control, video processing, character control, and/por the like.

According to various embodiments of the present disclosure, the application 134 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an internet browsing application, a gaming application, a media playback application, an image/video capture application, a file management application, and/or the like. In addition to or as an alternative to, the application 134 may be an application that is associated with information exchange between the electronic device 101 and an external electronic device (e.g., electronic device 104). As an example, the application 134 that is associated with the information exchange may include a notification relay application that may provide the external electronic device with a certain type of information, a device management application that may manage the external electronic device, and/or the like.

As an example, the notification relay application may include a functionality that provides notification generated by other applications at electronic device 101 (e.g., the SMS/MMS application, the email application, the health care application, the environmental information application, the instant messaging application, the call application, the internet browsing application, the gaming application, the media playback application, the image/video capture application, the file management application, and/or the like) to an external electronic device (e.g., the electronic device 104). In addition to or as an alternative to, the notification relay application may provide, for example, receive notification from an external electronic device (e.g., the electronic device 104), and may provide the notification to a user.

As an example, the device management application may manage enabling or disabling of functions associated with least a portion of an external electronic device (e.g., the external electronic device itself, or one or more components of the external electronic device) in communication with electronic device 101, controlling of brightness (or resolution) of a display of the external electronic device, an application operated at, or a service (e.g., a voice call service, a messaging service, and/or the like) provided by, the external electronic device, and/or the like.

According to various embodiments of the presnet disclosure, as an example, the application 134 may include one or more applications that are determined according to a property (e.g., type of electronic device, and/or the like) of the external electronic device (e.g., the electronic device 104). For example, if the external electronic device is an mp3 player, the application 134 may include one or more applications related to music playback. As another example, if the external electronic device is a mobile medical device, the application 134 may be a health care-related application. According to various embodiments of the present disclosure, the application 134 may include at least one of an application that is preloaded at the electronic device 101, an application that is received from an external electronic device (e.g., the electronic device 104, a server 106, and/or the like), and/or the like.

The I/O interface 140 may, for example, receive instruction and/or data from a user. The I/O interface 140 may send the instruction and/or the data, via the bus 110, to the processor 120, the memory 130, the communication interface 160, the application processing module 170, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, the application processing module 170, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. As an example, the display 150 may display a Graphical User Interface (GUI) with which a user may interact with the electronic device 101.

The communication interface 160 may provide communication between electronic device 101 and one or more external electronic devices (e.g., the electronic device 104, the server 106, and/or the like). For example, the communication interface 160 may communicate with the external electronic device by establishing a connection with a network 162 using wireless or wired communication. As an example, wireless communication with which the communication interface 160 may communicate may be at least one of, Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and/or the like. As an example, wired communication with which the communication interface 160 may communicate may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network, the Internet, the Internet of Things, a telephone network, and/or the like. According to various embodiments of the present disclosure, a protocol (e.g., a transport layer protocol, a data link layer protocol, a physical layer protocol, and/or the like) for communicating between electronic device 101 and an external electronic device may be supported by, for example, at least one of the application 134, the API 133, the middleware 132, the kernel 131, the communication interface 160, and/or the like.

Figure 2:
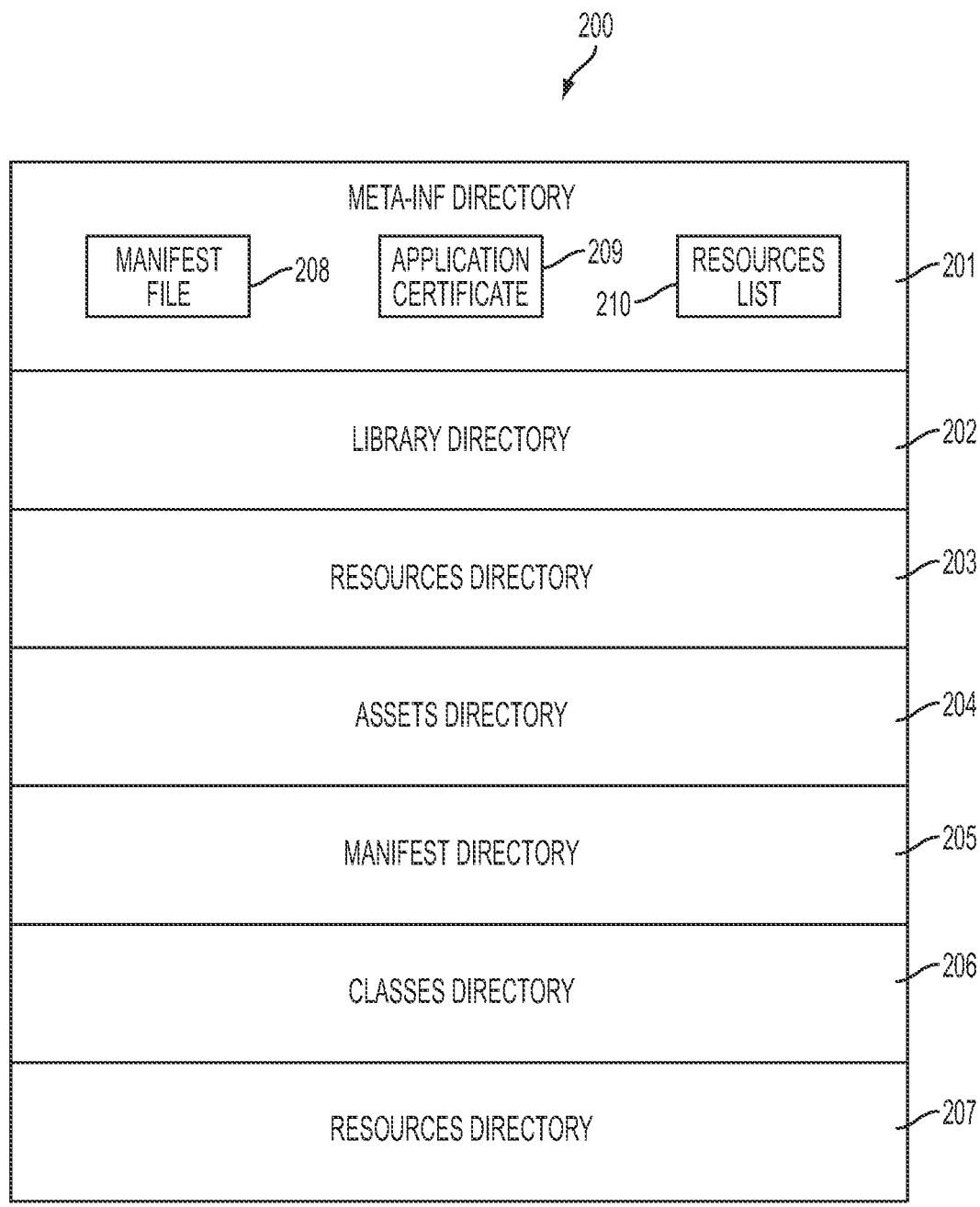
FIG. 2 illustrates an application file structure according to an exemplary embodiment of the present invention.

The application processing module 170 may, for example, process at least a part of information received from other components (e.g., the processor 120, the memory 130, the I/O interface 140, the communication interface 160, and/or the like), and provide various information, services, and/or the like to the user in various manners. For example, the application processing module 170 may control via the processor 120 or independently at least some of the functions of the electronic device 101 to communicate or connect to another electronic device (e.g., the electronic device 104, the server 106, and/or the like). FIG. 2 will provide additional information regarding the application processing module 170.

FIG. 2 illustrates an application file structure according to an exemplary embodiment of the present invention.

Referring to FIG. 2, the application file may be for an android OS, and, accordingly, may be an Android Application Package (APK) file 200. However, the present disclosure is not limited thereto, and the application file may be for any suitable and/or similar operating system and may be any similar and/or suitable file. For example, the application file may be for an Apple iOS, a Windows OS, a Symbian OS, a Debian based OS, such as Ubuntu, and may respectively be one of a .app file, a .msi and/or .msp file, and a deb package file.

The APK file 200 is a package file, including a plurality of directories, used to contain an application, including respective metadata, resources, files, data, and information, that is to be executed by an electronic device, such as the electronic device 101. The APK file 200 may be installed by a user of the electronic device 101 and/or may be installed by a manufacturer and/or distributor of the electronic device 101. The APK file 200 may be used to distribute and install application files, libraries, and/or data, to and on the electronic device 101. For example, the user of the electronic device 101 may download and the APK file 200 using Radio Frequency (RF) communication to connect to a communication network and/or another electronic device that performs RF communication. The communication network may be any suitable communication network, such as a cellular network, a Wi-Fi network, an Ethernet network, or any other similar and/or suitable wired and/or wireless communication network.

The APK file 200 may include at least one of a Meta-Information (META-INF) directory 201, a library (lib) directory 202, a resources (res) directory 203, an assets directory 204, a Manifest directory 205, a classes directory 206, and an Android Resource (arsc) directory, such as a resources directory 207. The META-INF directory 201 may include at least one of a manifest file 208, such as MANIFEST.MF, an application certificate 209, such as CERT.RSA, and a resources list 210, such as CERT.SF, including a cryptographic hash function digest, e.g., a Secure Hash Algorithm-1 (SHA-1) digest.

The lib directory 202 may include at least one directory including compiled code corresponding to a processor. For example, the lib directory 202 may include at least one of an armeabi directory (not shown) for ARM processors, an armeabi-v7a directory (not shown) for ARMv7 processors, an x86 directory (not shown) for x86 processors, and a Microprocessor without Interlocked Pipeline Stages (MIPS) directory (not shown) for MIPS processors. The res directory 203 may include resources that are not included in the resources directory 207. The assets directory 204 may include application assets, which may be used by an asset manager. The Manifest directory 205 may include an additional manifest file, that is in addition to the manifest file 208 included in the META-INF directory 201, providing further information corresponding to an application. The classes directory 206, which may also be referred to as a classes.dex directory, may include classes compiled for use by a Dalvik Virtual Machine (VM), which is a process VM and/or application VM that may be used by an Android OS. The resources directory 207 may include precompiled resources.

Figure 3:
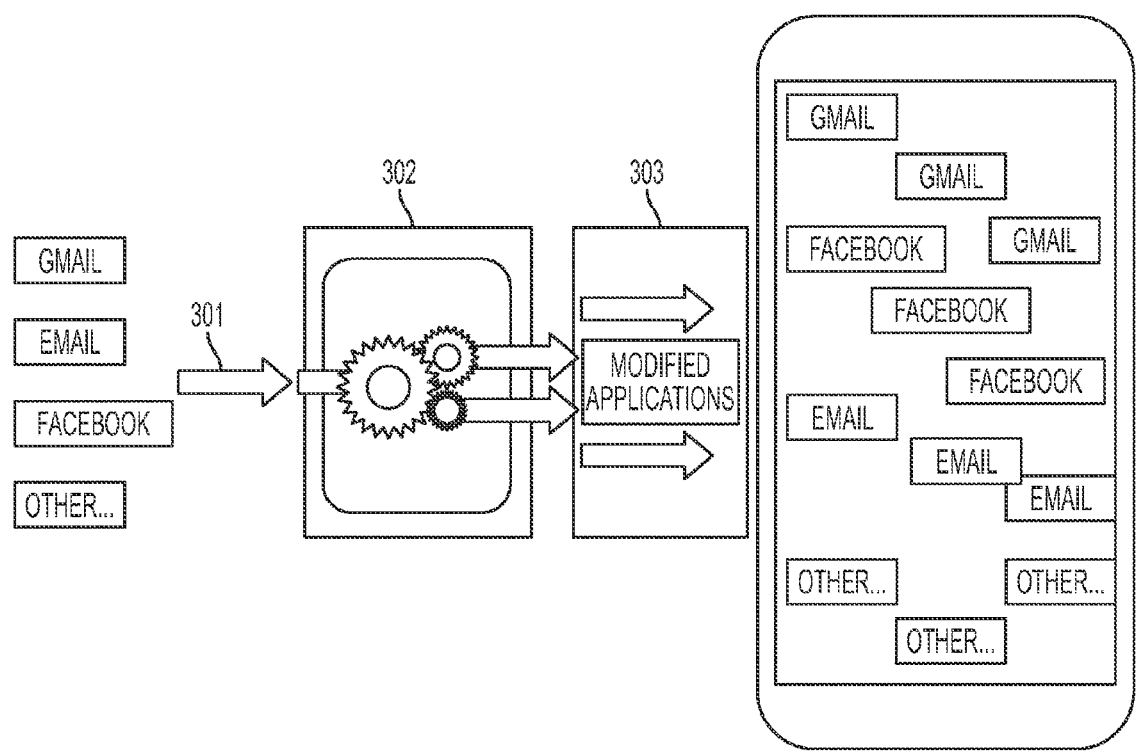
FIG. 3 illustrates a static method of isolating applications according to various embodiments of the present disclosure.

FIG. 3 illustrates a static method of isolating applications according to an embodiment of the present disclosure.

Referring to FIG. 3, the static method of isolating the applications includes preprocessing of an application before installation of the application in order to install an already modified version of an application on the mobile terminal. In further detail, the static method of isolating the applications may include analyzing of an application, preparing of the application, and overwriting a previous instance of the application with the prepared application.

In the static method illustrated in FIG. 3, changing and/or replacing any original images and/or icons of an application is performed prior to installation of an application, such that disassembling application may be performed as needed. Additionally, collecting of needed information about images/icons by reading and parsing all entries from an application, overwriting and/or replacing needed original images and/or icons, and assembling and/or packaging all entries back to the application may be performed prior to installation of the application.

As shown in FIG. 3, at least one of a plurality of applications, such as Google Mail application, an e-mail application, a Facebook application, a music player application, or any other similar and or suitable application, may be selected for isolation in operation 301. Each of the plurality of applications may have a file structure as illustrated in FIG. 2. However, the present disclosure is not limited thereto, and each of the plurality of applications may have any similar and/or suitable file structure that may be isolated according to the embodiment of FIG. 3.

At operation 302, the at least one selected application, from among the plurality of applications, is preprocessed, or in other words processed, so as to be at least one modified application. In further detail, an APK of the at least one selected application may be isolated by extracting and modifying an APK manifest of the APK. Modifying the APK may include changing and/or modifying various descriptors included in the APK manifest. For example, references, which may include explicit references, to process names may be modified so as to be unique across all applications, or in other words, the references to process included in the APK manifest may be modified to be unique for each application. Additionally, the APK manifest may be modified by adding application permissions such as special application permissions, and by modifying Android components that are defined when the selected application corresponding to the APK manifest is installed and/or downloaded. Accordingly, the selected application corresponding to the APK manifest that has been modified as described above may be installed alongside an original version of the selected application.

Modifying the APK, or in other words, isolating the APK, may further include containerizing a Dalvik Executable (DEX) file corresponding to the at least one selected application, the DEX file being at least one program and/or application that has been translated into Dalvik bytecode, which may also be referred to as Dalvik machine bytecode. The Dalvik bytecode may be analyzed and modified to provide data isolation and runtime isolation, in or other words, to isolate data corresponding to the Dalvik bytecode and to isolate execution of the selected application.

The data isolation and the runtime isolation of the Dalvik bytecode may be provided in order to intercept flow of the selected application corresponding to the Dalvik bytecode in certain scenarios. In other words, the data isolation and the runtime isolation intercept may be provided by isolating flow of a program and/or an application in a at least one of a state, a scenario, and/or under at least one condition, and to make changes to the program flow, i.e., a logic and/or set of instructions of the program, at an occurrence of the at least one of the state, the scenario, and/or under the at least one condition.

The flow of the program may be isolated by replacing and/or modifying methods and/or processes included in the Dalvik bytecode with and/or according to proxy methods configured to provide the data isolation and the runtime isolation. In addition, an object configured to provide the data isolation and the runtime isolation may be inserted into a class hierarchy of the Dalvik bytecode and/or original code associated with the selected application. By using the proxy methods and/or the objects, a behavior of the selected application may be modified such that passing, i.e., transmitting and/or receiving, of messages, which may also be referred to as intents, by an application and/or between applications may be controlled to provide the data isolation and the runtime isolation.

For example, an intent that launches a camera application, such as a camera application that is included in an electronic device including a camera, may be modified to launch a secure camera application that provides data isolation and runtime isolation. The modifications made in order to containerize the DEX file may match the modifications made to the APK manifest to isolate the APK. Accordingly, a similarly modified set of applications may cooperate as a group and may be isolated according to a sandbox including the similarly modified set of application. Furthermore, the modified APK manifest and the modified DEX file are repackaged into a new APK, and the new APK may be signed with an appropriate certificate in order to ensure integrity of the APK as being ready to be containerized and/or included in a sandbox.

Next, at operation 303, the at least one modified application is installed on an electronic device, such as the electronic device 101. Accordingly, a user of the electronic device 101 may execute and/or run concurrent instances of each of the at least one modified applications, such that each instance of the at least one modified applications does not share resources with another instance of the at least one modified applications.

Figure 4:
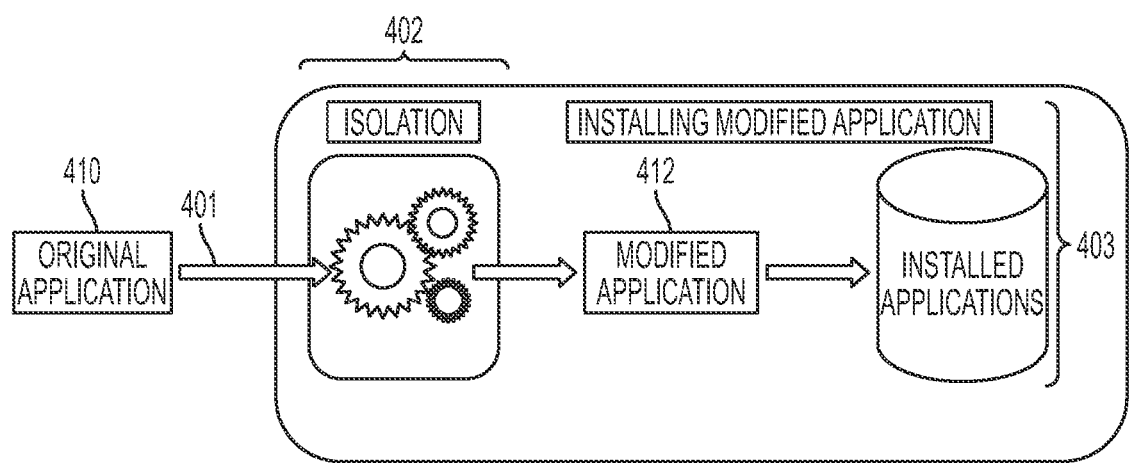
FIG. 4 illustrates a dynamic method of isolating applications according to an embodiment of the present disclosure.

FIG. 4 illustrates a dynamic method of isolating applications according to an embodiment of the present disclosure.

Referring to FIG. 4, the dynamic method of isolating the applications includes modifying an application during installation of the application on a mobile terminal. At operation 401, an original application 410 is selected from among a plurality of applications stored on an electronic device, such as the electronic device 101. Next, at operation 402, the selected original application 410 is modified according to an isolation process performed so as to generate a modified application 412. In order to generate the modified application 412, the electronic device 101 may modify an APK manifest included in an APK of the selected original application 410 as described above with reference to FIG. 3. After the modified application 412 has been generated, at operation 403, the modified application 412 is stored on the electronic device 101.

Accordingly, the dynamic method of FIG. 4 includes analyzing an application prior to installation of the application and, during runtime, overwriting images "on the fly," or in other words, during and as a process included in the runtime of the application. In order to change and/or replace any original images and/or icons using the dynamic method, all needed images are modified during the runtime. Accordingly, the dynamic method may include collecting needed information about images and/or icons by reading and parsing all entries from an application, installing an original application without any changes, and modifying, on the device, standard software and/or modules responsible for the handling all activities related to the application installation process and image loading.

Additionally, the dynamic method of FIG. 4 may include recognizing when an image and/or icon should be replaced and/or overwritten during loading and/or presentation of the application, replacing and/or overwriting a particular image "on the fly" on the device and/or remotely, and presenting a newly created image instead of the original one.

Figure 5:
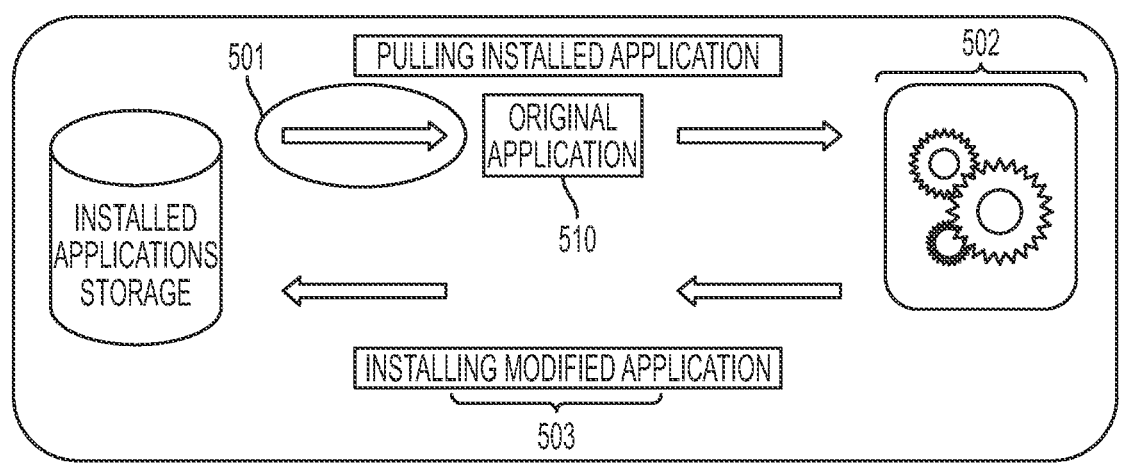
FIG. 5 illustrates a combined method of isolating applications according to an embodiment of the present disclosure.

FIG. 5 illustrates a combined method of isolating applications according to an embodiment of the present disclosure.

Referring to FIG. 5, at operation 501, an original application 510 is pulled from among a plurality of installed applications stored on an electronic device, such as the electronic device 101 in order to modify the original application 510 so as to include the modified application in a sandbox. In other words, at least one application, i.e. the original application 510 may be selected from among the plurality of installed applications to be included in the sandbox. For example, the original application 510 may be selected by a user of the electronic device and/or the application may be selected automatically to be included the sandbox.

At operation 502, the original application 510 is modified to be included in the sandbox. The original application 510 may be modified in a manner similar to the operations, such as the preprocessing of the at least one selected application, described at operation 302 of FIG. 3, and accordingly, description of such operations will be omitted herein for the purpose of brevity. Next, at operation 503, the modified application may installed according to the preprocessing performed in operation 502 so as to be executed with data isolation and runtime isolation provided according to the sandbox.

Additionally, at and/or after operation 502, the combined method of isolating applications may include analyzing an application before installation of the application, generating a new image and/or icon after the installation of the application, and saving the application locally on the device, on the external memory or remotely, and using the application later by replacing the original application.

In further detail, changing and/or replacing any original images and/or icons of an application using the combined method of FIG. 5 includes collecting needed information about images and/or icons by reading and parsing all entries from an application, installing the original application without any changes, modifying standard software and/or modules on the device responsible for all activities related to the application installation process and image loading. The combined method further includes determining which image and/or icon should be replaced and creating a new image locally and/or remotely during at least one of installation of the application, a first run of the application, and performing overwriting of the application as a separate process, saving the newly created images locally and/or remotely, and presenting the new images instead of the original images and/or icons.

Figure 6A:
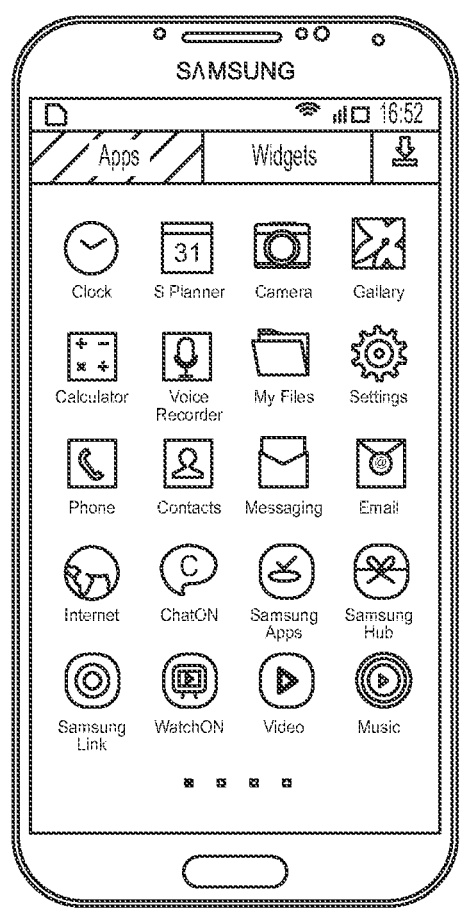
FIGS. 6A, 6B, and 6C illustrate screen shots of isolating multiple instances of an application according to an exemplary embodiment of the present application.
Figure 6B:
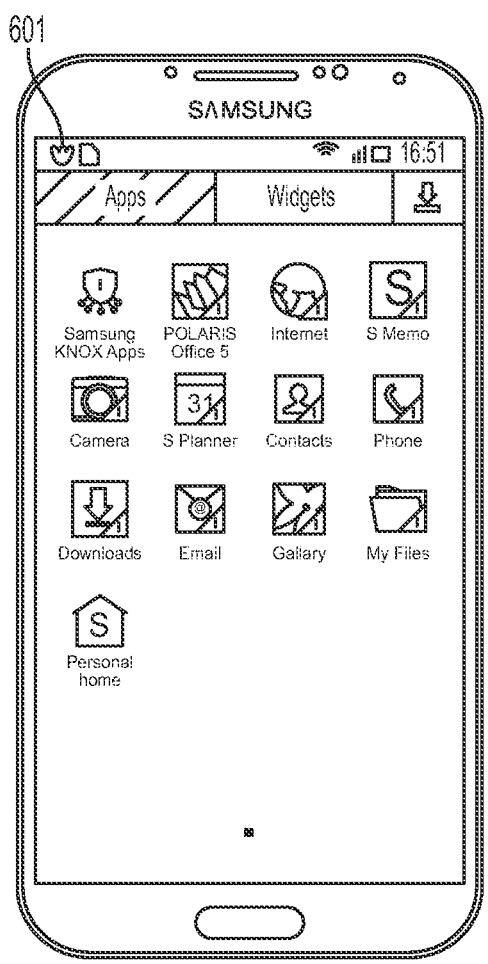
Figure 6C:
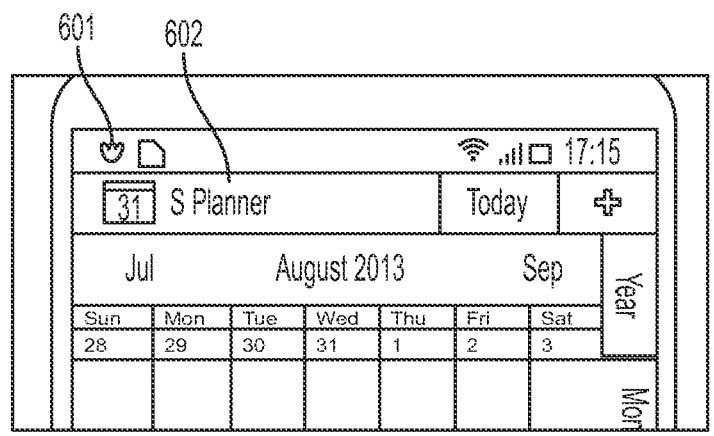

FIGS. 6A, 6B, and 6C illustrate screen shots of isolating multiple instances of an application according to an exemplary embodiment of the present application.

Referring to FIG. 6A, a home screen including a plurality of applications and/or widgets that may be executed on an electronic device are shown. At least one of the plurality of applications and/or widgets may be included in a sandbox. The sandbox may be preconfigured to include at least one of the plurality of applications and/or widgets and/or a user of the electronic device may select at least one of the plurality of applications and/or widgets to be included in a sandbox.

Referring to FIG. 6B, the at least one of the applications and/or widgets included in the sandbox may be displayed on a screen of the electronic device. A sandbox indicator 601 may be displayed on the screen including the plurality of applications and/or widgets included in the sandbox to indicate that only the plurality of applications and/or widgets included in the sandbox are displayed on the screen of the electronic device.

Referring to FIG. 6C, an application 602, from among the at least one application and/or widget included in the sandbox may be executed so as to provide data isolation and application isolation during execution of the application 602.

Figure 7:
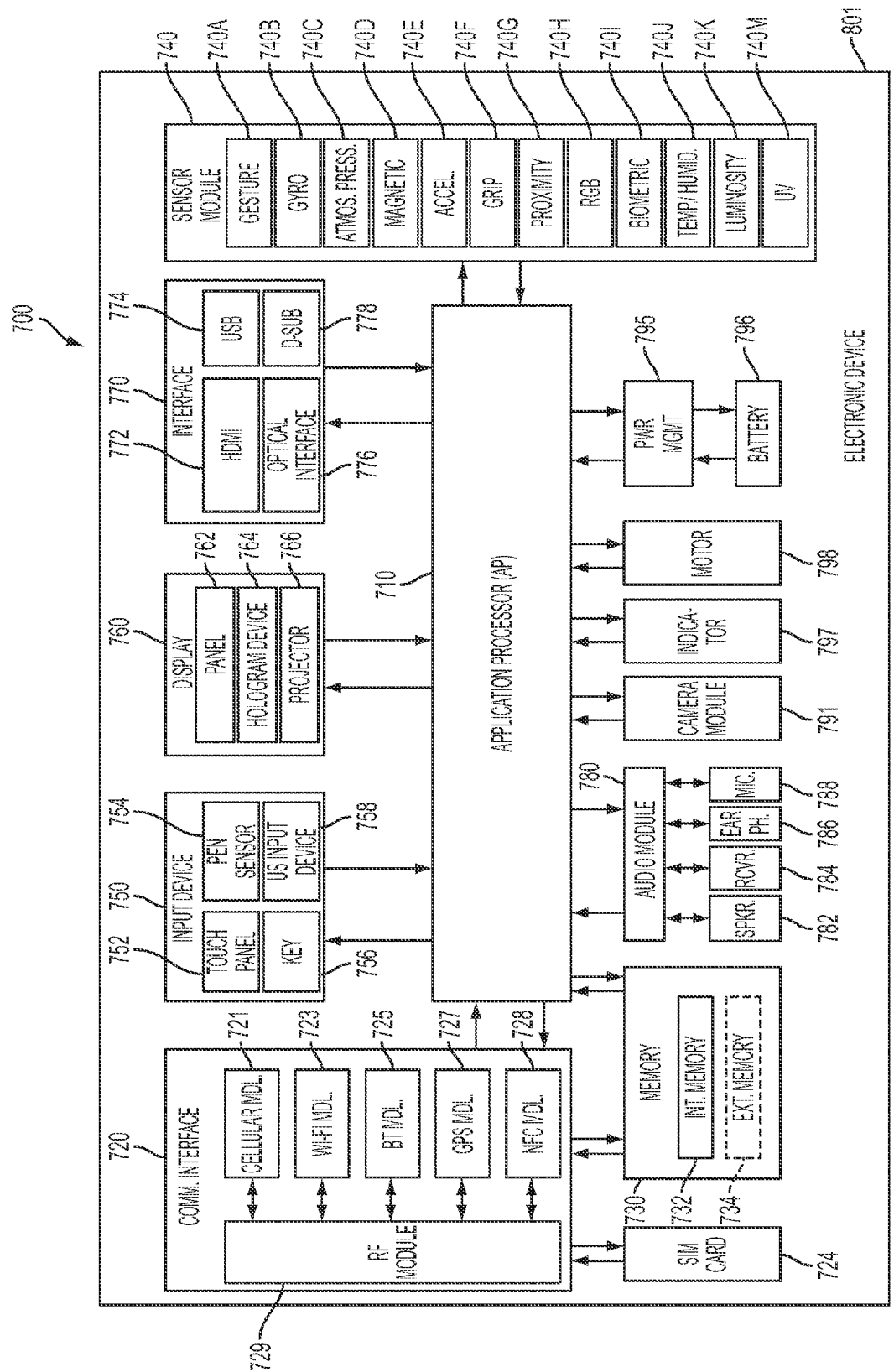
FIG. 7 illustrates a block diagram of hardware according to various embodiments of the present disclosure.

FIG. 7 illustrates a block diagram of hardware according to various embodiments of the present disclosure.

Referring to FIG. 7, hardware 701 may be, for example, a part or all of the electronic device 101. The hardware 701 may include one or more Application Processors (AP) 710, a communication module 720, a Subscriber Identification Module (SIM) card 724, a memory 730, a sensor module 740, an input module 750, a display module 760, an interface 770, an audio module 780, a camera module 791, a power management module 795, a battery 796, an indicator 797, a motor 798, and/or the like.

The AP 710 may control one or more hardware or software components that are connected to AP 710, perform processing or computation of data (including multimedia data), and/or the like. As an example, the AP 710 may be implemented as a System-on-Chip (SoC). The AP 710 may include a Graphics Processing Unit (GPU) (not shown).

The communication module 720 (e.g., the communication interface 160) may transmit and receive data in communications between the electronic device 101 and other electronic devices (e.g., the electronic device 104, the server 106, and/or the like). As an example, the communication module 720 may include one or more of a cellular module 721, a Wi-Fi module 723, a Bluetooth module 725, a GPS module 727, a NFC module 728, a Radio Frequency (RF) module 729, and/or the like.

The cellular module 721 may provide services such as, for example, a voice call, a video call, a Short Messaging Service (SMS), internet service, and/or the like, via a communication network (e.g., LTE, LTE-A, CDMA, WCDMA, UMTS, WiBro, GSM, and/or the like). As an example, the cellular module 721 may differentiate and authorize electronic devices within a communication network using a Subscriber Identification Module (SIM) card (e.g., the SIM card 724). According to various embodiments of the present disclosure, the cellular module 721 may perform at least a part of the functionalities of the AP 710. For example, the cellular module 721 may perform at least a part of multimedia control functionality.

According to various embodiments of the present disclosure, the communication interface 720 and/or the cellular module 721 may include a Communication Processor (CP). As an example, the cellular module 721 may be implemented as SoC.

Although FIG. 7 illustrates components such as the cellular module 721 (e.g., CP), the memory 730, the power management module 795 as components that are separate from the AP 710, according to various embodiments of the present disclosure, the AP 710 may include, or be integrated with, one or more of the foregoing components (e.g., the cellular module 721).

According to various embodiments of the present disclosure, the AP 710, the cellular module 721 (e.g., CP), and/or the like, may process instructions or data received from at least one of non-volatile memory or other components by loading in volatile memory. The AP 710, the cellular module 721, the communication interface 720, and/or the like, may store at non-volatile memory at least one of data that is received from at least one of other components or data that is generated by at least one of the other components.

Each of the Wi-Fi module 723, the Bluetooth module 725, the GPS module 727, the NFC module 728, and/or the like may, for example, include one or more processors that may process data received or transmitted by the respective modules. Although FIG. 7 illustrates the cellular module 721, the Wi-Fi module 723, the Bluetooth module 725, the GPS module 727, and the NFC module 728 as separate blocks, according to various embodiments of the present disclosure, any combination (e.g., two or more) of the cellular module 721, the Wi-Fi module 723, the Bluetooth module 725, GPS module 727, the NFC module 728, and/or the like may be included in an Integrated Chip (IC) or an IC package. For example, at least some of the processors corresponding to the respective the cellular module 721, the Wi-Fi module 723, the Bluetooth module 725, the GPS module 727, the NFC module 728, and/or the like, may be implemented as a single SoC. For example, a CP corresponding to the cellular module 721 and a Wi-Fi processor corresponding to Wi-Fi module 723 may be implemented as a single SoC.

The RF module 729 may, for example, transmit and receive RF signals. Although not shown, the RF module 729 may include a transceiver, a Power Amp Module (PAM), a frequency filter, a Low Noise Amplifier (LNA), and/or the like. The RF module 734 may include one or more components for transmitting and receiving Electro-Magnetic (EM) waves (e.g., in free space or the like) such as, for example, conductors or conductive wires. Although FIG. 7 illustrates that the cellular module 721, the Wi-Fi module 723, the Bluetooth module 725, the GPS module 727, and the NFC module 728 are sharing one RF module 729, according to various embodiments of the present disclosure, at least one of the cellular module 721, the Wi-Fi module 723, the Bluetooth module 725, the GPS module 727, the NFC module 728, and/or the like may transmit and receive RF signals via a separate RF module.

The SIM card 724 may be a card implementing a SIM, and may be configured to be inserted into a slot disposed at a specified location of the electronic device. The SIM card 724 may include a unique identifier (e.g., Integrated Circuit Card IDentifier (ICCID)) subscriber information (e.g., International Mobile Subscriber Identity (IMSI)), and/or the like.

The memory 730 (e.g., memory 130) may include an internal memory 732, an external memory 734, or a combination thereof.

According to various embodiments of the present disclosure, the internal memory 732 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 732 may be a Solid State Drive (SSD). As an example, the external memory 734 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 734 may be operatively coupled to electronic device 101 via various interfaces. According to various embodiments of the present disclosure, the electronic device 701 may include recording devices (or recording media) such as, for example, Hard Disk Drives (HDD), and/or the like.

The sensor module 740 may measure physical/environmental properties detect operational states associated with electronic device 101, and/or the like, and convert the measured and/or detected information into signals such as, for example, electric signals or electromagnetic signals. As an example, the sensor module 740 may include at least one of a gesture sensor 740A, a gyro sensor 740B, an atmospheric pressure sensor 740C, a magnetic sensor 740D, an accelerometer 740E, a grip sensor 740F, a proximity sensor 740G, an RGB sensor 740H, a biometric sensor 740I, a temperature/humidity sensor 740J, a luminosity sensor 740K, a Ultra Violet (UV) sensor 740M, and/or the like. The sensor module 740 may detect the operation state of the electronic device and/or measure physical properties, and convert the detected or measured information into electrical signals. Additionally or alternatively, the sensor module 740 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 740 may also include control circuitry for controlling one or more sensors included therein.

The input module 750 may include a touch panel 752, a (digital) pen sensor 754, a key 756, an ultrasonic input device 758, and/or the like.

As an example, the touch panel 752 may detect touch input using capacitive, resistive, infrared, ultrasonic methods, and/or the like. The touch panel 752 may also include a touch panel controller (not shown). As an example, a capacitive-type touch panel may detect proximity inputs (e.g. hovering input) in addition to, or as an alternative to, physical touch inputs. The touch panel 752 may also include a tactile layer. According to various embodiments of the present disclosure, the touch panel 752 may provide haptic feedback to the user using the tactile layer.

As an example, the (digital) pen sensor 754 may be implemented using methods identical to or similar to receiving a touch input from a user, or using a separate detection sheet (e.g., a digitizer).

As an example, the key 756 may be a keypad, a touch key, and/or the like.

As an example, the ultrasonic input device 758 may be a device configured to identify data by detecting, using a microphone (e.g., a microphone 788), ultrasonic signals generated by a device capable of generating the ultrasonic signal. The ultrasonic input device 758 may detect data wirelessly.

According to various embodiments of the present disclosure, the electronic device 101 may receive user input from an external device (e.g., a network, computer or server) connected to the electronic device 101 using the communication module 720.

The display module 760 (e.g., display 150) may include a panel 762, a hologram device 764, a projector 766, and/or the like. As an example, the panel 762 may be, for example, a Liquid-Crystal Display (LCD), an Active-Matrix Organic Light-Emitting Diode (AM-OLED) display, and/or the like. As an example, the panel 762 may be configured to be flexible, transparent, and/or wearable. The panel 762 and the touch panel 752 may be implemented as a single module. The hologram device 764 may provide a three-dimensional image. For example, the hologram device 764 may utilize the interference of light waves to provide a three-dimensional image in empty space. The projector 766 may provide image by projecting light on a surface (e.g., a wall, a screen, and/or the like). As an example, the surface may be positioned internal or external to electronic device 101. According to various embodiments of the present disclosure, the display module 760 may also include a control circuitry for controlling the panel 762, the hologram device 764, the projector 766, and/or the like.

The interface 770 may include, for example, one or more interfaces for a High-Definition Multimedia Interface (HDMI) 772, a Universal Serial Bus (USB) 774, a projector 776, or a D-subminiature (D-sub) 778, and/or the like. As an example, the interface 770 may be part of the communication interface 720. Additionally or alternatively, the interface 770 may include, for example, one or more interfaces for Mobile High-definition Link (MHL), Secure Digital (SD)/ MultiMedia Card (MMC), Infrared Data Association (IrDA), and/or the like.

The audio module 780 may encode/decode sound into electrical signal, and vice versa. According to various embodiments of the present disclosure, at least a portion of audio module 780 may be part of the I/O interface 140. As an example, the audio module 780 may encode/decode voice information that is input into, or output from, the speaker 782, the receiver 784, the earphone 786, the microphone 788, and/or the like.

The camera module 791 may capture still images and/or video. According to various embodiments of the present disclosure, the camera module 791 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 795 may manage electrical power of the electronic device 101. Although not shown, the power management module 795 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the electronic device 101 may include wired or wireless charging. The charger IC may charge a battery, may prevent excessive voltage or excessive current from a charger from entering the electronic device 101, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

As an example, the battery gauge may measure a charge level, a voltage while charging, a temperature of battery 796, and/or the like.

As an example, the battery 796 may supply power to the electronic device 101. As an example, the battery 796 may be a rechargeable battery, a solar battery, and/or the like.

The indicator 797 may indicate one or more states (e.g., boot status, message status, charge status, and/or the like) of the electronic device 101 or a portion thereof (e.g., the AP 710). Motor 798 may convert an electrical signal into a mechanical vibration.

Although not shown, the electronic device 101 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method for isolating at least one of a plurality of applications included in an electronic device, the method comprising:
    selecting at least one of the plurality of applications included in the electronic device;
    moving and processing the at least one selected application in a sandbox isolating the at least one selected application from others of the plurality of applications so as to be at least one modified application, the sandbox providing data isolation for processing of the at least one selected application; and
    installing and executing the at least one modified application on the electronic device so as to be executed only according to the sandbox, the sandbox providing runtime isolation for execution of the at least one selected application.

2. The method of claim 1, wherein the selecting of the at least one of the plurality of applications included in the electronic device comprises:
    displaying the at least one of the plurality of applications on the electronic device; and
    receiving a user input indicating the at least one selected application from among the displayed at least one of the plurality of applications.

3. The method of claim 1,
    wherein the processing of the at least one selected application comprises isolating an application file corresponding to the at least one selected application to be the at least one modified application included in the sandbox, and
    wherein the at least one modified application includes at least one of a modified application manifest or a modified Dalvik Executable (DEX) file.

4. The method of claim 3, wherein the isolating of the application file corresponding to the at least one selected application comprises:

extracting an application manifest corresponding to the application file;

modifying the application manifest to be the modified application manifest; and storing the modified application manifest so as to correspond to the at least one modified application included in the sandbox.

5. The method of claim 4, wherein the modifying of the application manifest comprises:

modifying at least one of a descriptor or a reference included in the application manifest, wherein the at least one of the descriptor or the reference may correspond to at least one of a process name, a file name, a memory location, a device, an address, a pointer, or an operating system component.

6. The method of claim 4, wherein the modifying of the application manifest comprises:

at least one of adding or modifying at least one of an application permission or an operating system component, wherein the at least one of the application permission and the operating system component may be defined when the at least one selected application is at least one of installed or downloaded.

7. The method of claim 3, wherein the isolating of the application file corresponding to the at least one selected application comprises containerizing a DEX file corresponding to the at least one selected application to be the modified DEX file, and wherein the DEX file may include Dalvik bytecode.

8. The method of claim 7, wherein the containerizing of the DEX file comprises at least one of replacing or modifying at least one process included in the Dalvik bytecode with at least one proxy method configured to provide the data isolation and runtime isolation for execution of the at least one selected application, and wherein the at least one modified process controls at least one of transmitting or receiving of messages by the at least one selected application.

9. The method of claim 7, wherein the containerizing of the DEX file comprises inserting an object into a class hierarchy of the Dalvik bytecode, and wherein the object controls at least one of transmitting or receiving of messages by the at least one selected application.

10. The method of claim 3, wherein the isolating of the application file corresponding to the at least one selected application to be the at least one modified application included in the sandbox comprises packaging the at least one modified application manifest and the at least one modified DEX file into a modified application package corresponding to the modified application, and wherein the modified application package includes a certificate indicating integrity of the modified application package.

11. An apparatus for isolating at least one of a plurality of applications included in an electronic device, the apparatus comprising:

a display configured to:

display the plurality of applications included in the electronic device, and receive a user input selecting at least one of the plurality of applications;

a processor configured to:

move and preprocess the at least one selected application in a sandbox isolating the at least one selected application from others of the plurality of applications so as to be at least one modified application, the sandbox providing data isolation for preprocessing of the at least one selected application, and install and execute the at least one modified application on the electronic device so as to be executed only according to the sandbox, the sandbox providing runtime isolation for execution of the at least one selected application; and a memory configured to store the at least one modified application.

12. The apparatus of claim 11, further comprising an input/output (I/O) interface configured to receive a user input indicating the at least one selected application from among the displayed plurality of applications.

13. The apparatus of claim 11, wherein the processor is further configured to isolate an application file corresponding to the at least one selected application to be the at least one modified application included in the sandbox, and wherein the at least one modified application includes at least one of a modified application manifest or a modified Dalvik Executable (DEX) file.

14. The apparatus of claim 13, wherein the processor is further configured to:

extract an application manifest corresponding to the application file, modify the application manifest to be the modified application manifest, and store the modified application manifest so as to correspond to the at least one modified application included in the sandbox in the memory.

15. The apparatus of claim 14, wherein the processor is further configured to modify at least one of a descriptor or a reference included in the application manifest, and wherein the at least one of the descriptor or the reference may correspond to at least one of a process name, a file name, a memory location, a device, an address, a pointer, or an operating system component.

16. The apparatus of claim 14, wherein the processor is further configured to at least one of add or modify at least one of an application permission or an operating system component, and wherein the at least one of the application permission or the operating system component may be defined when the at least one selected application is at least one of installed or downloaded.

17. The apparatus of claim 13, wherein the processor is further configured to containerize a DEX file corresponding to the at least one selected application to be the modified DEX file, and wherein the DEX file may include Dalvik bytecode.

18. The apparatus of claim 17, wherein the processor is further configured to at least one of replace or modify at least one process included in the Dalvik bytecode with at least one proxy method configured to provide the data isolation and runtime isolation for execution of the at least one selected application, and wherein the at least one modified process controls at least one of transmitting or receiving of messages by the at least one selected application.

19. The apparatus of claim 17,
wherein the processor is further configured to insert an object into a class hierarchy of the Dalvik bytecode, and
wherein the object controls at least one of transmitting or receiving of messages by the at least one selected application.

20. The apparatus of claim 13,
wherein the processor is further configured to package the at least one modified application manifest or the at least one modified DEX file into a modified application package corresponding to the modified application, and
wherein the modified application package includes a certificate indicating integrity of the modified application package.

* * * * *